US012198180B2

(12) United States Patent
Ohara

(10) Patent No.: US 12,198,180 B2
(45) Date of Patent: *Jan. 14, 2025

(54) MANAGEMENT SERVER FOR AUTOMATIC ORDERING OF CONSUMABLE ITEMS

(71) Applicant: Brother Kogyo Kabushiki Kaisha, Nagoya (JP)

(72) Inventor: Kiyotaka Ohara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1027 days.

This patent is subject to a terminal disclaimer.

(21) Appl. No.: 16/993,468

(22) Filed: Aug. 14, 2020

(65) Prior Publication Data

US 2020/0372566 A1 Nov. 26, 2020

Related U.S. Application Data

(63) Continuation of application No. 15/086,830, filed on Mar. 31, 2016, now Pat. No. 10,810,651.

(30) Foreign Application Priority Data

Mar. 31, 2015 (JP) .................................. 2015-073537
Feb. 3, 2016 (JP) .................................. 2016-018665

(51) Int. Cl.
*G06Q 30/0601* (2023.01)
*G06F 3/12* (2006.01)
(Continued)

(52) U.S. Cl.
CPC ....... *G06Q 30/0635* (2013.01); *G06F 3/1204* (2013.01); *G06F 3/121* (2013.01);
(Continued)

(58) Field of Classification Search
USPC ............................................... 705/26.1–27.2
See application file for complete search history.

(56) References Cited

U.S. PATENT DOCUMENTS 9,684,478 B2 6/2017 Ramchandran
10,810,651 B2 * 10/2020 Ohara ................ G06Q 30/0223
(Continued)

FOREIGN PATENT DOCUMENTS

JP 2002-127572 A 5/2002
JP 2003-076754 A 3/2003
(Continued)

OTHER PUBLICATIONS

OfficeMax enters canada office products market with launch of new E-commerce site and plans for catalog distribution. (May 7, 2003). Canada NewsWire Retrieved from https://dialog.proquest.com/professional/docview/453359173?accountid=131444 (Year: 2003).*

(Continued)

*Primary Examiner* — Jeffrey A. Smith
*Assistant Examiner* — Ashley D Preston
(74) *Attorney, Agent, or Firm* — Banner & Witcoff, Ltd.

(57) ABSTRACT

An information processing apparatus includes a communication interface, a storage, and a controller. The controller is configured to: acquire consumable item information including remaining amount information about a remaining amount of a consumable item; output screen information about an input screen to which condition information about an order condition for ordering a new consumable item for replacement is inputted; receive the condition information inputted to the input screen displayed on the basis of the screen information; determine whether or not the order condition represented by the received condition information is met in response to acquisition of the consumable item information; and output order information including infor- (Continued)

mation about an order of the new consumable item to a server in response to determination that the order condition represented by the received condition information is met.

7 Claims, 12 Drawing Sheets

(51) Int. Cl.
  *G06K 15/00* (2006.01)
  *G06Q 10/083* (2024.01)
  *G06Q 30/0207* (2023.01)
  *G06K 15/10* (2006.01)
(52) U.S. Cl.
  CPC ....... *G06K 15/002* (2013.01); *G06K 15/4075* (2013.01); *G06Q 10/083* (2013.01); *G06Q 30/0223* (2013.01); *G06Q 30/0224* (2013.01); *G06K 15/102* (2013.01)

(56) References Cited

U.S. PATENT DOCUMENTS

| | | | | |
|---|---|---|---|---|
| 2001/0034665 | A1* | 10/2001 | Kinory | G06Q 10/08 705/26.1 |
| 2002/0010611 | A1 | 1/2002 | Yamaji et al. | |
| 2002/0072998 | A1 | 6/2002 | Haines et al. | |
| 2008/0071626 | A1 | 3/2008 | Hill | |
| 2010/0030653 | A1 | 2/2010 | Westphal | |
| 2011/0311243 | A1* | 12/2011 | Kawai | G03G 15/556 399/28 |
| 2014/0052573 | A1* | 2/2014 | Oh | G06Q 10/10 705/26.8 |
| 2015/0178654 | A1* | 6/2015 | Glasgow | G06Q 10/06315 705/7.25 |
| 2015/0302510 | A1 | 10/2015 | Godsey et al. | |

FOREIGN PATENT DOCUMENTS

| | | |
|---|---|---|
| JP | 2005-157866 A | 6/2005 |
| JP | 2007-279944 A | 10/2007 |
| JP | 2008-271231 A | 11/2008 |
| JP | 2013-109202 A | 6/2013 |
| WO | 2014120184 A1 | 8/2014 |

OTHER PUBLICATIONS

Jul. 3, 20190—(JP) Office Action—App 2016-018665.
Farhad Manjoo, "How your printer tricks you into buying ink and toner when you don't need it", Aug. 21, 2008, Slate.com (Year: 2008).

* cited by examiner

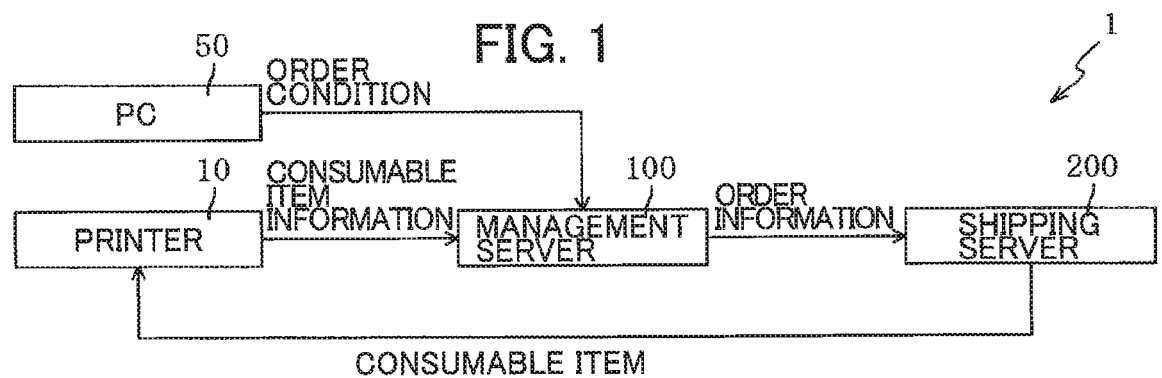

FIG. 4A  102a

| CHOICES | ORDER INDEX 102a1 | THRESHOLD VALUE 102a2 |
|---|---|---|
| | REMAINING INK AMOUNT (%) | 80% |
| | | 60% |
| | | 40% |
| | | 20% |
| | | 10% |
| | REMAINING INK AMOUNT (ml) | 50ml |
| | | 20ml |
| | | 10ml |
| | REMAINING INK AMOUNT (g) | 50g |
| | | 20g |
| | | 10g |

FIG. 4B  102b

| CHOICES | ORDERING FREQUENCY 102b1 |
|---|---|
| | 1 |
| | 3 |
| | 5 |

FIG. 4C  102c

| CHOICES | MULTI-ORDER ACTION 102c1 |
|---|---|
| | ALL ORDERS |
| | ONLY ONE ORDER |
| | INQUIRY |

FIG. 4D

| | 102D1 | 102D2 | 102D3 | 102D4 | 102D5 | 102D6 | 102D7 | 102D8 | 102D9 | 102D10 |
|---|---|---|---|---|---|---|---|---|---|---|
| USER ACCOUNT | MODEL NO. OF PRINTER | SERIAL NUMBER | MODEL NO. OF INK CARTRIDGE | CAPACITY | ORDER INDEX | THRESHOLD VALUE | ORDERING FREQUENCY | MULTI-ORDER ACTION | REMAINING AMOUNT | NUMBER OF REPLACEMENTS |
| ABC | XX | 01234567 | CYAN 212 | 100ml | REMAINING INK AMOUNT (%) | 20% | 2 | INQUIRY | 80% | 3 |
| | | | MAGENTA 212 | 100ml | REMAINING INK AMOUNT (%) | 20% | 2 | INQUIRY | 50% | 2 |
| | | | YELLOW 100 | 50ml | REMAINING INK AMOUNT (%) | 20% | 2 | INQUIRY | 30% | 3 |
| | | | BLACK 100 | 50ml | REMAINING INK AMOUNT (%) | 30% | 1 | ALL ORDERS | 80% | 4 |
| ... | | | | | ... | | | | | |
| DEF | YY | 23456789 | CYAN 212 | 100ml | REMAINING INK AMOUNT (%) | 20% | 1 | INQUIRY | 90% | 1 |
| | | | MAGENTA 212 | 100ml | REMAINING INK AMOUNT (%) | 20% | 1 | INQUIRY | 80% | 1 |
| | | | YELLOW 212 | 100ml | REMAINING INK AMOUNT (%) | 20% | 1 | INQUIRY | 80% | 1 |
| | | | BLACK 212 | 100ml | REMAINING INK AMOUNT (%) | 20% | 1 | INQUIRY | 70% | 1 |

102D

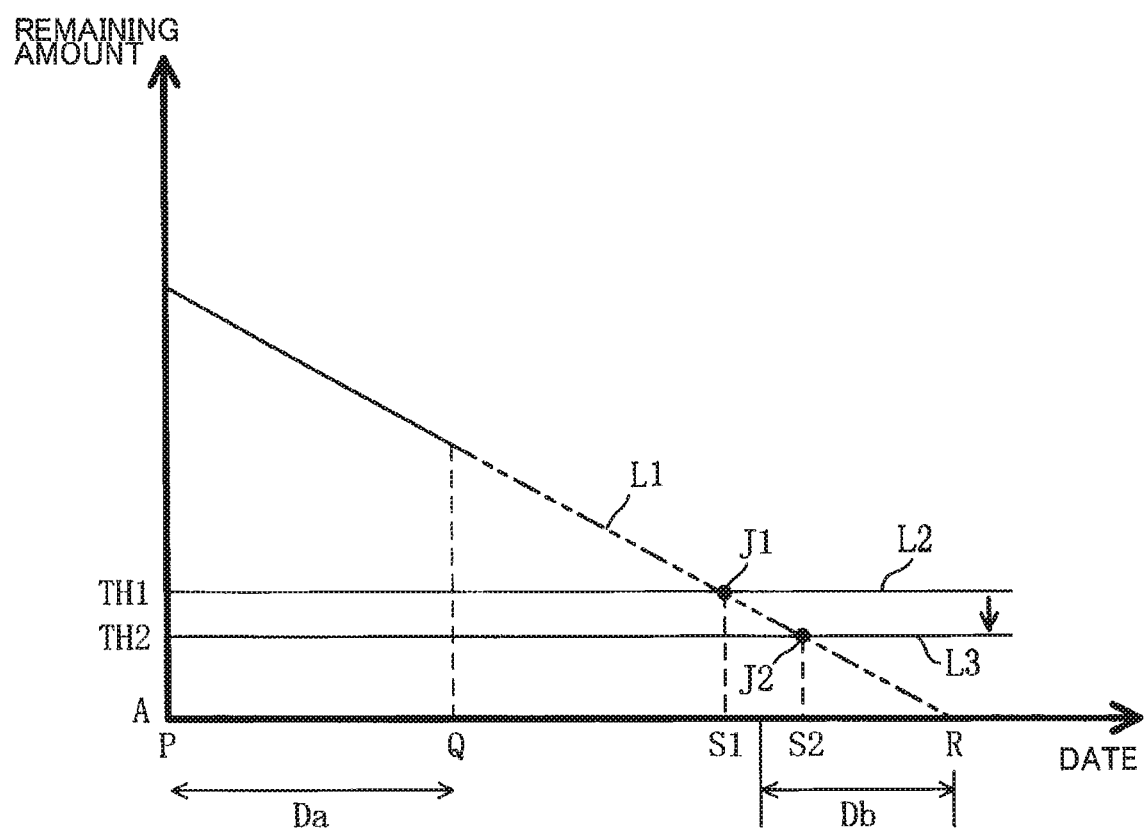

FIG 8

Dear Mr/Ms XX,

Thank you for utilizing our automatic delivery program for consumable items. Near-empty notifications on the same cartridge used in your equipment (Model No:P-123, Node Name:BP-456) have been received several times.

March 2, 2015 15:02 Yellow Ink: Shipped
March 3, 2015 15:15 Yellow Ink: Shipped
March 4, 2015 17:51: Most recent notification

⎫
⎬ 61
⎭

Two yellow ink cartridges have been shipped or are in the process of shipping. Please confirm that one more yellow ink cartridge needs to be shipped.

If your answer is YES, please click:
⟨http//:bprinter.com/odercomfirm.cgi?ordernumber=12345&order=yes⟩ ～62
If your answer is NO, please click:
⟨http//:bprinter.com/odercomfirm.cgi?ordernumber=12345&order=no⟩ ～63

Please note that supplemental ink cartridge will not be sent in the absence of your input of YES XO Co., Ltd.

MANAGEMENT SERVER FOR AUTOMATIC ORDERING OF CONSUMABLE ITEMS

CROSS REFERENCE TO RELATED APPLICATION

This application is a Continuation of prior U.S. application Ser. No. 15/086,830, filed on Mar. 31, 2016, which claims priorities from Japanese Patent Application Nos. 2015-073537 filed Mar. 31, 2015 and 2016-018665 filed Feb. 3, 2016. The entire contents of the applications are incorporated herein by reference.

TECHNICAL FIELD

The present disclosure relates to an information processing apparatus.

BACKGROUND

Japanese Patent Application Publication No. 2013-109202 discloses an image forming device that transmits a toner cartridge delivery request to a consumable item management system when a remaining amount of toner is less than a delivery threshold value. In the technique disclosed in Japanese Patent Application Publication No. 2013-109202, the delivery threshold value is determined using statistical data for predicting future toner consumption obtained on the basis of measured data of a consumed amount of a toner and the number of days necessary for delivery until a toner cartridge is delivered after the delivery request is transmitted.

SUMMARY

There are cases in which the consumed amount of the toner greatly changes according to user's circumstances. This point is not considered in the technique disclosed in Japanese Patent Application Publication No. 2013-109202. In the technique disclosed in Japanese Patent Application Publication No. 2013-109202, since the delivery threshold value is determined through the prediction based on the measured data of the consumed amount of the toner, when the consumed amount of the toner greatly changes according to the user's circumstances during a certain period of time compared to other periods of time, the change is not sufficiently reflected in the statistical data. As a result, a transmission timing of the delivery request is delayed, and the delivery of the toner cartridge is unlikely to be made in time. As described above, there is a limit to decision of an order timing based on measured data.

In view of the foregoing, it is an object of the present disclosure to provide an information processing apparatus capable of delivering a consumable item at an appropriate timing according to the user's circumstances.

In order to attain the above and other objects, the disclosure provides an information processing apparatus including: a communication interface; a storage; and a controller. The controller is configured to: acquire consumable item information including remaining amount information about a remaining amount of a consumable item; output screen information about an input screen to which condition information is inputted, the condition information being about an order condition for ordering a new consumable item for replacement; receive the condition information inputted to the input screen displayed on the basis of the screen information; in response to acquisition of the consumable item information, determine whether or not the order condition represented by the received condition information is met; and in response to determination that the order condition is met, output order information to a server, the order information including information about an order of the new consumable item.

According to other aspects, the disclosure provides an information processing apparatus including: a storage and a controller. The controller is configured to: acquire consumable item information including remaining amount information about remaining amount of a consumable item; output screen information about an input screen to which condition information is inputted, the condition information being about an order condition for ordering a new consumable item for replacement; acquire the condition information outputted from an output destination to which the screen information is outputted, in response to acquisition of the consumable item information, determine whether or not the order condition represented by the acquired condition information is met; and in response to determination that the order condition is met, determine to order the new consumable item.

BRIEF DESCRIPTION OF THE DRAWINGS

The particular features and advantages of the disclosure as well as other objects will become apparent from the following description taken in connection with the accompanying drawings, in which:

FIG. 1 is a block diagram illustrating an overall configuration of a consumable item ordering system according to a first embodiment;

FIG. 2 is a block diagram illustrating an electrical configuration of a management server according to the first embodiment;

FIG. 4A is a table illustrating choices of an threshold value;

FIG. 4B is a table illustrating choices of an order frequency;

FIG. 4C is a table illustrating choices of a multi-order action;

FIG. 4D is a table illustrating a relationship a use account and a group of values set by a use to which the user account is assigned;

FIG. 5 is a graphical representation illustrating a primary regression straight line used for predicting usage trend of the consumable item;

FIG. 8 is a schematic diagram illustrating an example of an inquiry e-mail;

DETAILED DESCRIPTION

Figure 3:
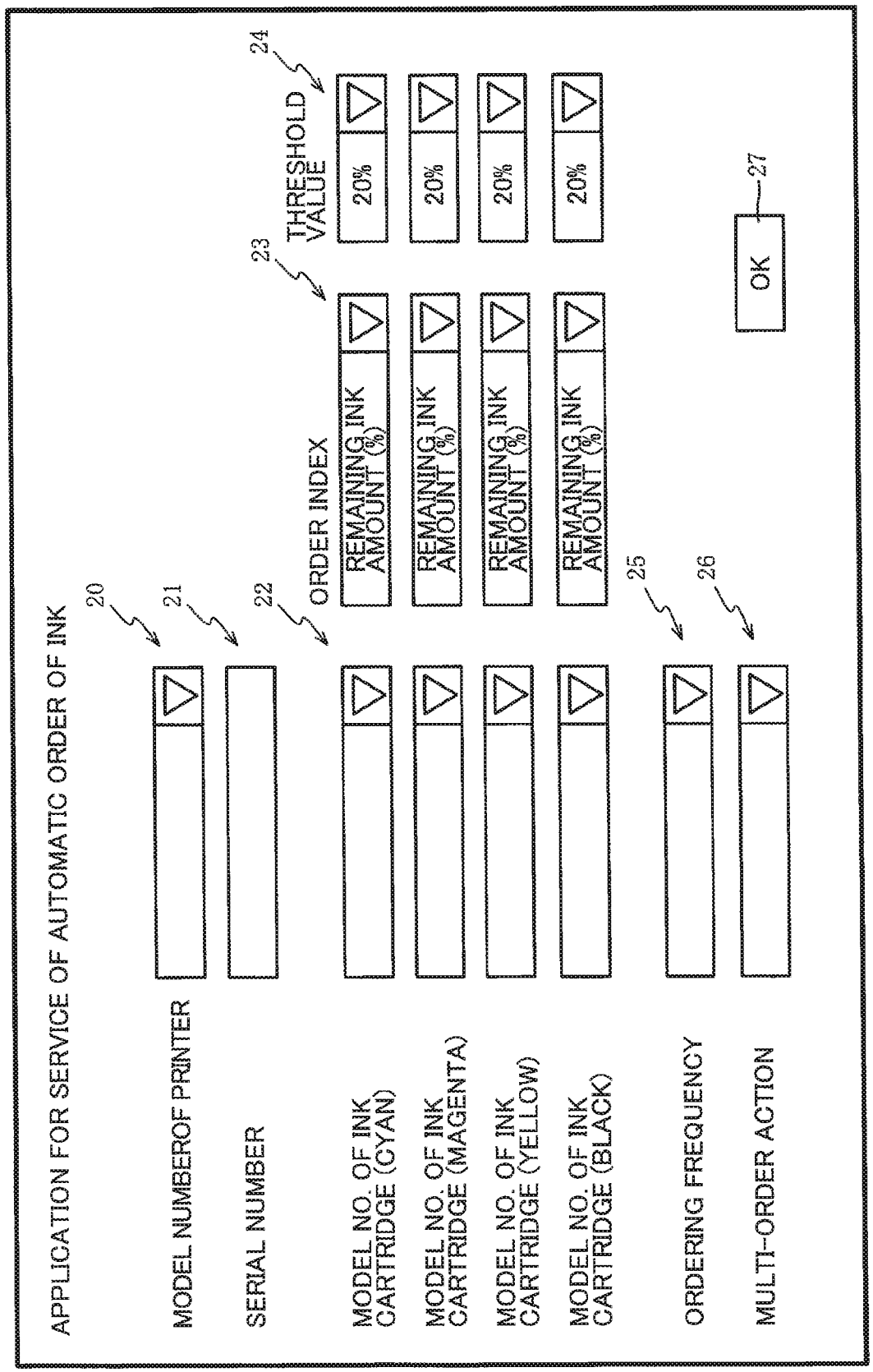
FIG. 3 is a schematic diagram illustrating an example of a condition input screen used for inputting information about an order condition.

An information processing apparatus according to embodiments will be described while referring to the accompanying drawings wherein like parts and components are designated by the same reference numerals to avoid duplicating description. It would be apparent to those skilled in the art that various changes and modifications may be made therein without departing from the scope of the disclosure. Further, any components and processes described in following embodiments can arbitrary combined.

First Embodiment

First, a first embodiment will be described while referring to FIGS. 1 to 8. FIG. 1 is a block diagram illustrating an overall configuration of a consumable item ordering system 1. The consumable item ordering system 1 includes a printer 10, a personal computer (hereinafter, referred to as a "PC") 50, a management server 100, and a shipping server 200. The management server 100 is an example of claimed "information processing apparatus." The shipping server 200 is an example of claimed "server." As will be described later in detail, on the basis of an order condition set by the user, the management server 100 in the first embodiment determines whether or not an automatic order of the consumable item is made.

In the consumable item ordering system 1, the PC 50 transmits information about the order condition to the management server 100. Examples of the information about the order condition include a threshold value of the remaining amount of the consumable item, an ordering frequency, and an action at the time of the occurrence of a situation in which there is a possibility that a plurality of orders will be required. The information about the order condition will be described later with reference to FIG. 3. The PC 50 may be configured to transmit the information about the order condition to the shipping server 200 so that the information is transmitted to the management server 100 through the shipping server 200.

The printer 10 transmits unique information identifying the printer 10 and consumable item information to the management server 100 at each predetermined timing (for example, at a fixed time every day). In the present embodiment, the management server 100 transmits a consumable item information notification request at each predetermined timing. The printer 10 transmits the consumable item information to the management server 100 in response to receipt of the consumable item information notification request. The printer 10 may be configured to periodically transmit the consumable item information to the management server 100 without using the consumable item information notification request from the management server 100.

The unique information is a unique character string such as a MAC address of the printer 10, a node name of the printer 10 registered in advance, a model number of the printer 10, or the serial number allocated to an individual printer 10. In the present embodiment, the unique information of the printer 10 is the model number and the serial number of the printer 10. The claimed "unique information" may represent both or either one of the model number and the serial number of the printer 10. The claimed "unique information" may also represent the MAC address of the printer 10 or the node name of the printer 10 registered in advance.

The consumable item information includes information (hereinafter, referred to as "remaining amount information") about the remaining amount of the consumable item in use in the printer 10. The consumable item is, for example, an ink cartridge. The printer 10 includes a sensor that detects the remaining amount of the consumable item. Each time the consumable item information is transmitted, the printer 10 detects the remaining amount of the consumable item and transmits the consumable item information including the remaining amount information indicating the detected remaining amount to the management server 100. The remaining amount indicated by the remaining amount information may be a percentage of the remaining amount indicated by "%" or a physical amount indicated by "ml" or "g."

When the consumable item is the ink cartridge, a plurality of ink cartridges are mounted to the printer 10 for usable colors. The consumable item information includes information (hereinafter, referred to as "type information") about a type of the consumable item. In other words, the consumable item information includes, for each type of the consumable item, the type information and remaining amount information about the consumable item of the type indicated by the type information. In the present embodiment, the type of the consumable item indicated by the type information is the model number of the consumable item. For example, a color or a capacity of the consumable item can be specified by the model number of the consumable item. The type of the consumable item indicated by the type information may be a color or a capacity of the consumable item.

The consumable item information includes the number of times (hereinafter, referred to as the "number of replacements") the consumable item of the type indicated by the type information has been replaced. The printer 10 includes a replacement counter that counts the number of replacements of the consumable item for each type of the consumable item. The replacement counter is initialized to zero at the time of factory shipping of the printer 10. The printer 10 includes the number of replacements corresponding to the value of the replacement counter in the consumable item information.

The management server 100 analyzes the consumable item information received from the printer 10, and determines whether or not the order condition set by the PC 50 is met. When the management server 100 determines that the order condition is met, the management server 100 determines to order the consumable item, and transmits order information to the shipping server 200. The analysis of consumable item information is performed for each type indicated by the type information included in the consumable item information. The order information includes the type information corresponding to the type of the consumable item that is an order target, the unique information of the printer 10 serving as the transmission source of the consumable item information about the consumable item that is the order target, and an order request.

The shipping server 200 stores a shipping information table including, for a plurality of printers 10, the unique information of the printer 10 registered by each user, the model number of the consumable item that is the type of the consumable item, and information (hereinafter, simply referred to as "delivery destination information") about a delivery destination of the consumable item. In the shipping information table, the unique information, the model number, and the delivery destination information are associated for each user. The delivery destination information is, for example, an address of a delivery destination. Each information stored in the shipping information table is registered in advance by the user. In the shipping information table, the color of the consumable item may be associated with the model number of the consumable item of each color as the type of the consumable item.

When the shipping server 200 receives the order information from the management server 100, the shipping server 200 specifies the model number of the consumable item and the delivery destination information associated with the unique information included in the received order information with reference to the shipping information table, and performs a process for delivering the consumable item of the specified model number to the delivery destination indicated by the specified delivery destination information. As a result of the process, a right consumable item is delivered to the delivery destination identified by the order information, that is, the user having the printer 10 that is the target of the order information.

FIG. 2 is a block diagram illustrating an electrical configuration of the management server 100. The management server 100 is provided, for example, by a vendor of the printer 10. The management server 100 may be a device having a known server function. The management server 100 is provided with a controller 101, a storage 102, and a network interface (hereinafter, referred to as a "network I/F") 103, all of which are connected to each other via an input/output port 104. The network interface 103 is an example of claimed "communication I/F."

The controller 101 includes a CPU (not illustrated) and a ROM and a RAM that are electrically connected to the CPU, and thus constitutes a computer. The CPU controls an operation of the management server 100 according to a program and data stored in the ROM and the storage 102. The controller 101 is an example of claimed "controller."

The storage 102 is a non-volatile memory device. The storage 102 is, for example, a hard disk drive. The storage 102 stores various kinds of programs for controlling the operation of the management server 100, such as a program for executing respective processes through the controller 101 in FIGS. 6 and 7 which will be described later. The storage 102 stores the unique information of the printer 10 registered by the user. The unique information may be stored in association with each user account. The network I/F 103 is a device for communicating with other devices connected to the Internet 800. A known network card may be employed as the network I/F 103. The management server 100 is connected to the Internet 800 via the network I/F 103. The storage 102 is an example of claimed "storage."

The printer 10 includes a controller 11, a print processor 12, a connector 13, a reader 14, a detection sensor 15, and a network I/F 16, all of which are connected to each other via an input/output port 17. The controller 11 includes a CPU (not illustrated) and a ROM and a RAM that are electrically connected to the CPU, and constitutes a computer. The CPU controls an operation of the printer 10 according to a program and data stored in the ROM.

The print processor 12 is a printing mechanism and includes an ink jet head. The controller 11 inputs a driving signal to the print processor 12, and the ink jet head ejects ink from a nozzle according to the inputted driving signal. The print processor 12 may be a laser printing mechanism.

The connector 13 is connectable to a cartridge 21 filled with ink used for the print processor 12. The cartridges 21 that correspond to the number of usable ink colors according to the type of the printer 10 can be connected to the connector 13. In other words, one or more cartridges 21 corresponding to the type of the printer 10 can be connected to the connector 13. An IC chip storing a serial ID identifying the cartridge 21 is attached to the cartridge 21.

The reader 14 is configured to read the serial ID from the IC chip attached to the cartridge 21 connected to the connector 13. The detection sensor 15 is configured to detect the remaining amount of the ink in each of the cartridges 21 connected to the connector 13. The network I/F 16 is a device for communicating with other devices connected to the Internet 800.

The printer 10 is configured to be connected to a router 30 via the network I/F 16. The PC 50 is configured to be also connected to the router 30 via an internal network I/F (not illustrated). As a result, the printer 10 and the PC 50 are connected to the Internet 800 through the router 30. FIG. 2 illustrates the example in which the printer 10 and the PC 50 are connected to the same router 30, but the printer 10 and the PC 50 may be connected to the Internet 800 through different routers.

Communication between the management server 100 and the printer 10 is performed according to a connection establishment type protocol, more specifically, an XMPP over BOSH (an abbreviation of Extensible Messaging and Presence Protocol Over Bidirectional-Streams Over Synchronous HTTP). The XMPP over BOSH is an always-on connection type or a connection maintaining type protocol in which a connection-established state is substantially constantly maintained. Meanwhile, communication between the management server 100 and the shipping server 200 or the PC 50 is performed according to a HTTP (an abbreviation of a Hypertext Transfer Protocol).

FIG. 3 is a schematic diagram illustrating an example of a screen (hereinafter, referred to as a "condition input screen") that is displayed on a display (for example, a liquid crystal display device) of the PC 50 and used for inputting the information about the order condition. The PC 50 displays the condition input screen on the basis of an instruction given from the management server 100. The input screen may be displayed based on an instruction given from the shipping server 200. The condition input screen is displayed when a condition input screen display request is made by the PC 50 as necessary, for example, after user registration of the printer 10 is performed, or when the user desires to change the order condition. In either case, the condition input screen is displayed in a state in which the user signs in to the management server 100 using the user account allocated to the user and the unique information of the printer 10 is specified. In other words, the condition input screen is displayed on the PC 50 in a state where the user and the printer 10 is specified.

The condition input screen includes fields 20 to 26 and a button 27. The field 20 is a field for inputting the model number of the printer 10 that is a setting target. Choices of various kinds of model numbers are displayed on the field 20 as a drop-down list, and the model number selected among them is inputted. In the present embodiment, in addition to the model number of the printer provided by the vendor managing the management server 100, the drop-down list displayed on the field 20 includes the model numbers of various kinds of manufacturers of printers in the choices. Only the model number of the printer 10 registered by the user who has signed in may be displayed on the field 20.

The field 21 is a field for inputting the serial number allocated to an individual printer 10. The serial number is inputted to the field 21 through a direct input by the user. The serial number acquired from the printer 10 by the PC 50 may automatically be inputted to the field 21. In the condition input screen, instead of the fields 20 and 21, a field for inputting the MAC address of the printer 10 or the node name of the printer 10 registered in advance may be provided.

The field 22 is a field for inputting the model number of the ink cartridge (the consumable item). The field 22 is provided for each color of the ink cartridge mountable to the printer 10. In the example illustrated in FIG. 3, four fields for cyan, magenta, yellow, and black are provided. A drop-down list including the model numbers of the ink cartridges usable by the printer having the model number inputted to the field 20 as choices is displayed on the field 22, and the model number selected among them is inputted. The management server 100 stores information specifying, for example, a color or a capacity of the ink cartridge for each model number. Thus, when the model number inputted to the field 22 is transmitted to the management server 100, the management server 100 can determine the color or the capacity of the ink cartridge from the received model number.

The number of colors of the ink cartridges mountable to the printer 10 differs depending on the model number of the printer 10. Thus, the number of fields 22 displayed on the condition input screen may be increased or decreased according to the model number inputted to the field 20. Alternatively, the fields 22 may be displayed according to a maximum of the number of colors of the mountable ink cartridges. In this case, when there is a color of the ink cartridge unmountable to the printer having the model number inputted to the field 20, the color may be non-selectable.

The field 23 is a field for inputting an index (hereinafter, referred to as an "order index") used for ordering the ink cartridge. The field 23 is provided for each field 22, that is, for each color of the ink cartridge mountable to the printer 10. In the field 23, choices of available order indices are displayed as a drop-down list, and the order index selected among them is inputted. Examples of the order index include a percentage of a remaining ink amount indicated by a unit of "%" and a physical remaining ink amount indicated by a unit of "ml" or a unit of "g." In the example illustrated in FIG. 3, the percentage of a remaining ink amount indicated by a unit of "%" is inputted to the field 23 as a default of the order index.

The field 24 is a field for inputting a threshold value according to the order index input to the field 23. The field 24 is provided for each field 23, that is, for each color of the ink cartridge mountable to the printer 10. In the field 22, choices of the threshold value according to the order index inputted to the field 23 are displayed as a drop-down list, and the order index selected among them is inputted.

In the example illustrated in FIG. 3, a value such as 20% is inputted to the field 24 as a default of the threshold value. In the present embodiment, choices of the threshold value are prepared for each order index. Specifically, the storage 102 of the management server 100 stores a table 102a for managing the choices displayed on the field 23 and the field 24 as the drop-down list.

As illustrated in FIG. 4A, in the table 102a, values serving as choices are allocated to an item (that is, the order index) 102a1 corresponding to the field 23 and an item (that is, the threshold value) 102a2 corresponding to the field 24. Specifically, a "remaining ink amount (%)" serving as a remaining ink amount indicated by a unit of "%", a "remaining ink amount (ml)" serving as a remaining ink amount indicated by a unit of "ml", and a "remaining ink amount (g)" serving as a remaining ink amount indicated by a unit of "g" are allocated to the item 102a1. Thus, the drop-down list constituted by the choices of the "remaining ink amount (%)," the "remaining ink amount (ml)," and the "remaining ink amount (g)" is displayed on the field 23.

On the other hand, values serving as choices are allocated to the item 102a2 in association with the respective values of the item 102a1. Specifically, for the remaining ink amount (%) of the item 102a1, "10%," "20%," "40%," "60%," and "80%" are allocated as choices of the remaining ink amount (%). Thus, when the remaining ink amount (%) is selected in the field 23, the drop-down list constituted by the choices of "10%," "20%," "40%," "60%," and "80%" is displayed on the field 24. Further, even for the remaining ink amount (ml) and the remaining ink amount (g) of the item 102a1, the respective values serving as the choices are allocated.

The management server 100 may acquire the delivery destination information corresponding to the printer 10 serving as the target from the shipping server 200, and the threshold value according to the delivery destination indicated by the delivery destination information may be displayed on the field 24 as a default. For example, as the delivery destination becomes further away from a delivery source, the threshold value displayed as the default increases. The delivery destination information may be stored in the management server 100.

A range of the choices selectable in the field 24 may be changed according to the delivery destination. For example, as the delivery destination is getting further, the selectable range of the choices in the field 24 increases. Since the number of days (hereinafter, referred to as the "number of delivery days") required for delivery of the consumable item differs depending on the delivery destination, by changing the selectable range of the choices in the field 24 according to the delivery destination, an appropriate threshold value in which the number of delivery days is considered can be shown to the user. The value inputted to the field 24 may be a value inputted directly to the field 24 other than a value selected from the drop-down list.

The field 25 is a field for inputting an ordering frequency N (N is an integer of 1 or larger). The ordering frequency N indicates the number of ink cartridges in which the remaining amount has fallen below the threshold value set in the fields 23 and 24 until an automatic order is made. When the ordering frequency N is 1, it indicates that the automatic order is given each time the remaining amount of the ink cartridge reaches the threshold value. On the other hand, when the ordering frequency N is two or larger, it indicates that one automatic order is made each time the number of ink cartridges in which the remaining amount has reached the threshold value set in the fields 23 and 24 reaches N. In the field 25, displayed is the drop-down list representing candidate values for the ordering frequency N as choices.

Specifically, the storage 102 of the management server 100 stores a table 102b that manages the choices displayed on the field 25 as the drop-down list. As illustrated in FIG. 4B, in the table 102b, values of choices (that is, candidates of a value of N) are allocated to an item (that is, the ordering frequency) 102b1 corresponding to the field 25. Specifically, "1," "3," and "5" are allocated to the item 102b1. Thus, the drop-down list constituted by choices of "1," "3," and "5" are displayed on the field 25.

The field 26 is a field for inputting a multi-order action, more specifically, an action at the time of the occurrence of a situation (hereinafter, referred to as "multi-order situation") in which there is a possibility that a plurality of orders will be required. For example, when the user replaces the currently using ink cartridge with a new one after the automatic order is made by the management server 100, if the ink is consumed relatively fast in terms of the number of delivery days of the new consumable item, a new order condition is met for further replacement of the ink cartridge during delivery based on the automatic order, that is, the multi-order situation takes place.

Further, the multi-order situation occurs even when the printer 10 is not connected with the management server 100 due to a bad network environment, or the consumption of the consumable item is faster than a receiving interval of the consumable item information. In these cases, the number of replacements included in the consumable item information most recently received from the printer 10 by the management server 100 is neither the same value as nor consecutive to the previous value. In other words, it is an action taken on the ink cartridge in which, although there is a trace of replacement in the printer 10 during a period of time from an immediately previous reception timing of the consumable item information to a most recent reception timing thereof, the management server 100 places no automatic order.

In the field 26, displayed is the drop-down list including choices for selecting whether a plurality of orders are placed, only one order is placed, or an inquiry is given to the user in the multi-order situation. The choice selected among them is inputted in the field 26 as the multi-order action. The "multi-order situation" is a situation in which a new order condition is met for a next consumable item during delivery based on the automatic order or a situation in which the number of replacements included in the consumable item information most recently received from the printer 10 by the management server 100 is neither the same value as nor consecutive to the previous value.

Specifically, the storage 102 of the management server 100 stores a table 102c that manages choices displayed on the field 26 as the drop-down list. As illustrated in FIG. 4C, in the table 102c, values serving as choices are allocated to an item 102c1 (that is the multi-order action) corresponding to the field 26. Specifically, "all orders" indicating that a plurality of orders are all placed, "only one order" indicating that only one order is placed, and "inquiry" indicating that an inquiry is made to the user, are allocated to the item 102c1. Thus, on the field 25, displayed is the drop-down list constituted by choices of "all orders," "only one order," and "inquiry."

The button 27 is an operator for instructing decision of the inputs to the fields 20 to 26. When the button 27 is operated, the input values of the fields 20 to 26 are transmitted to the management server 100. The management server 100 stores the model number of the printer inputted to the field 20 and the serial number inputted to the field 21 in the storage 102 as the unique information. A value stored as the unique information may be one of the model number and the serial number of the printer.

The management server 100 stores the model number of the ink cartridge inputted to the field 22 in the storage 102 as the type information. The management server 100 stores the values inputted to the fields 23 and 24 in the storage 102 as an automatic order threshold value that is one of the order conditions in association with the model number of the ink cartridge (the type information) inputted to the field 22. The management server 100 stores the ordering frequency inputted to the field 25 in the storage 102 as one of the order conditions. The management server 100 stores the multi-order action inputted to the field 26 in the storage 102 as one of the order conditions.

Specifically, the storage 102 of the management server 100 stores a table 102d that manages content that is inputted to the fields 20 to 26 of the condition input screen and is received from the printer 10. As illustrated in FIG. 4D, in the table 102d, a printer model number 102d1, a serial number 102d2, an ink model number 102d3, a capacity 102d4, an order index 102d5, a threshold value 102d6, an ordering frequency 102d7, a multi-order action 102d8, a remaining amount 102d9, and the number of replacements 102d10 are associated with a user account 102d0.

Upon receiving the values inputted to the fields 20 to 26 of the condition input screen from the printer 10, in association with the signed-in user account 102d0, the management server 100 stores the value inputted to the field 20 in the printer model number 102d1, stores the value inputted to the field 21 in the serial number 102d2, stores the value input to the field 22 in the ink model number 102d3, stores the value input to the field 23 in the order index 102d5, stores the value input to the field 24 in the threshold value 102d6, stores the value input to the field 25 in the ordering frequency 102d7, and stores the value inputted to the field 26 in the multi-order action 102d8.

The capacity of the ink cartridge specified by the model number stored in the ink model number 102d3 is stored in the capacity 102d4. The management server 100 stores information for specifying the capacity of the ink cartridge for each the model number. When the model number of the ink cartridge is received from the printer 10, the management server 100 specifies the capacity of the ink cartridge corresponding to the received model number therefrom, and stores the specified capacity value in the capacity 102d4.

The remaining amount of the ink cartridge currently in use in the printer 10 is stored in the remaining amount 102d9. Upon receiving the consumable item information from the printer 10, the management server 100 stores the remaining amount represented by the remaining amount information included in the consumable item information in the remaining amount 102d9 corresponding to the model number of the ink cartridge (that is, the value of the ink model number 102d3) indicated by the type information that corresponds to the represented remaining amount and is included in the consumable item information.

The number of replacements included in the consumable item information received from the printer 10 is stored in the number of replacements 102d10. Upon receiving the consumable item information from the printer 10, the management server 100 stores the number of replacements included in the consumable item information in the number of replacements 102d10 corresponding to the model number of the ink cartridge (that is, the value of the ink model number 102d3) indicated by the type information corresponding to the number of replacements included in the consumable item information.

Further, when the button 27 is operated, the shipping server 200 may be a transmission destination of the values inputted to the fields 20 to 26. In this case, the management server 100 acquires the values inputted to the fields 20 to 26 via the shipping server 200.

Since the condition input screen can be displayed according to the display request as described above, the user can appropriately change the order condition through the condition input screen. However, when the user changes the automatic order threshold value, the changed threshold value may be inappropriate. In other words, in the changed automatic order threshold value, a situation in which the delivery of the consumable item is not made in time may occur at a time point when the remaining amount reaches the automatic order threshold value.

Here, the above-mentioned problematic situation will be described with reference to FIG. 5. FIG. 5 is a graphical representation in which the horizontal axis indicates dates and the vertical axis indicates the remaining amount of the consumable item. The management server 100 calculates the use prediction information on the basis of the remaining amount information included in the consumable item information received from the printer 10 at each predetermined timing (for example, at a fixed time every day).

Specifically, the use prediction information is calculated on the basis of time variation in the remaining amount of the consumable item indicated by the remaining amount information included in the consumable item information. For example, when the consumable item information is acquired at a fixed time every day, from a date P on which the consumable item is replaced, the remaining amount is plotted each time the consumable item information is received from the printer 10. More specifically, when the consumable item is received, the remaining amount represented by the remaining amount information included in the currently received consumable item information is plotted in correspondence to a date on which the currently received consumable item information is received as the current remaining amount in the consumable item of the type indicated by the type information included in the currently receive consumable item information.

The use prediction information is calculated on the basis of the time variation in the remaining amount. For example, as illustrated in the graph illustrated of FIG. 5, a primary regression straight line L1 is calculated as the use prediction information on the basis of points plotted on dates from a date P to a date Q which is Da days after the date P. All the points plotted on days from the date P to the date Q need not be used for the calculation of the primary regression straight line L1. In FIG. 5, the plotted points are not illustrated in the graph indicating the time variation in the remaining amount.

In the graph illustrated in FIG. 5, the primary regression straight line L1 and the horizontal axis intersect on a date R. In other words, on the date R the remaining amount of the consumable item currently in use is assumed to reach a remaining amount A. The remaining amount A is such a small amount that the consumable item is determined to be unusable in the printer 10. Also, the primary regression straight line L1 and a straight line L2 intersect on an intersection J1. The straight line L2 indicates a threshold value (an automatic order threshold value) TH1 set by an input through the condition input screen. Therefore, on a date S1 corresponding to the intersection J1, the remaining amount of the consumable item in use is assumed to reach the threshold value TH1.

As can been seen from the graph illustrated in FIG. 5, when the number of days between the date R and the date Si is equal to or larger than the number of days (hereinafter, referred to as the "number of delivery days") Db required for delivery of the consumable item, the automatic order of the consumable item made on the date Si results in completion of delivery of the ordered consumable item before the consumable item in use becomes unusable.

The number of delivery days Db is calculated on the basis of the delivery destination information. For example, when the delivery destination information includes an address, a zip code, or a telephone number, the number of delivery days Db is calculated using the number of days required for delivering the consumable item to a house or a region specified by the address and the like described above. In the present embodiment, the delivery destination information is stored in the shipping server 200 for each unique information. Thus, when the number of delivery days Db is calculated, the management server 100 acquires, from the shipping server 200, the delivery destination information corresponding to the unique information of the printer 10 serving as the transmission source of the consumable item information.

Meanwhile, when the user changes the threshold value from TH1 to TH2 smaller than TH1, the primary regression straight line L1 and a straight line L3 which indicates a threshold value TH2 intersect on an intersection J2. In other words, on a date S2 corresponding to the intersection J2 the remaining amount of the consumable item currently in use reaches the threshold value TH2. Since the date S2 comes after the date S1, the number of days between the date R and the date S2 is smaller than the number of delivery days Db. Consequently, when the automatic order of the consumable item is placed on the date S2, it is unlikely to complete delivery of the ordered consumable item before the consumable item in use becomes unusable. In other words, the changed automatic order threshold value TH2 is a threshold value in which the consumable item is unlikely to be ordered in time, and the change to the threshold value TH2 is inappropriate.

In the present embodiment, when the inappropriate order condition is set via the condition input screen, the management server 100 displays a confirmation screen (not illustrated) on a display of the PC 50. Thus, the user can be informed that the order condition is inappropriate.

Figure 6:
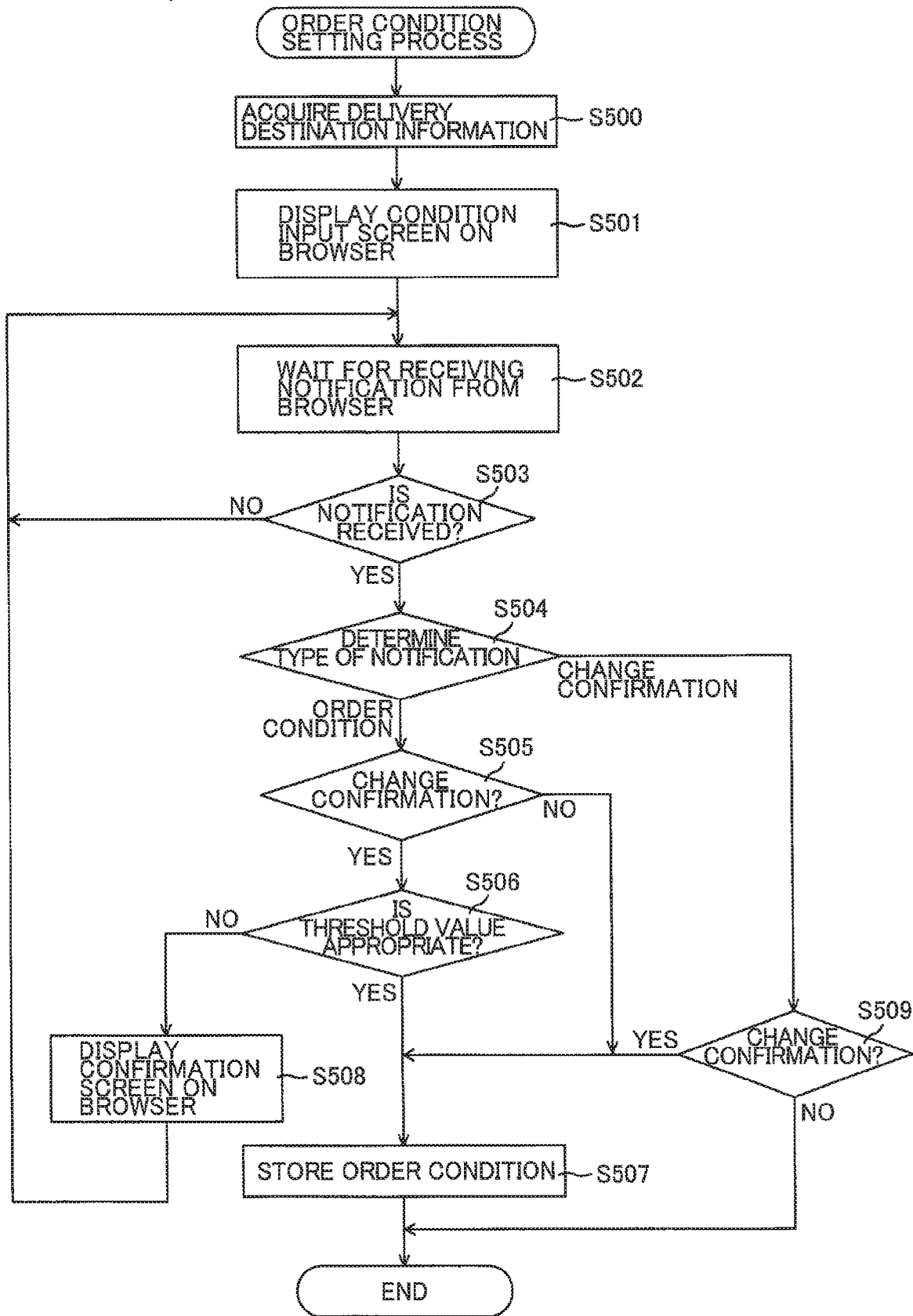
FIG. 6 is a flowchart illustrating an order condition setting process.

FIG. 6 is a flowchart illustrating an order condition setting process. This process is a process performed by the CPU of the controller 101 of the management server 100. This process starts when a situation in which the condition input screen is displayed on the PC 50 takes place. This situation occurs, for example, after the user registration of the printer 10 is performed or when the condition input screen display request is made from the PC 50 as necessary, for example, when the user changes the order condition.

The CPU of the controller 101 (hereinafter, referred to simply as a "CPU") acquires the delivery destination information corresponding to the unique information of the printer 10 that is the target from the shipping server 200 (S500). In other words, the CPU acquires the delivery destination information corresponding to the unique information with respect to the signed-in user account. The CPU displays the condition input screen on a browser of the PC 50 (S501). At this time, the CPU displays the threshold value as a default in the field 24 of the condition input screen displayed on the browser. The threshold value displayed in the field 24 corresponds to the delivery destination indicated by the delivery destination information acquired in S500. The display destination is the PC 50 that performed the user registration of the printer 10 or is the transmission source of the condition input screen display request.

The CPU is on standby for reception of a notification from the PC 50 that is the communication destination (S502). The CPU determines whether or not the notification has been received from the PC 50 (S503). When the CPU determines that the notification has not been received from the browser (S503: No), the CPU performs the process in S502 again.

On the other hand, when the CPU determines that notification has been received from the PC 50 (S503: Yes), the CPU determines a type of the received notification (S504). When the CPU determines that the received notification is a notification of the order condition (S504: order condition), the CPU determines whether the currently received notification of the order condition is a notification for changing the order condition (S505). The management server 100 stores the order condition in the table 102d for each user account. The management server 100 specifies the user (the user account) who is using the PC 50 that is the display destination of the condition input screen on the basis of the user account inputted from the PC 50.

When the order condition corresponding to the user using the PC 50 is not stored, the CPU determines that the currently received notification of the order condition is a new order condition other than the notification for changing the order condition (S505: No). The CPU stores each order condition included in the received notification in the table 102d of the storage 102 in association with the specified user account (S507), and ends this process.

In further detail, according to the signed-in user account 102d0 in the table 102d, the CPU stores each order condition in the order index 102d5, the threshold value 102d6, the ordering frequency 102d7, and the multi-order action 102d8 for the user account 102d0. Further, each order condition such as the automatic order threshold value is stored in association with the ink model number 102d3 that is the model number of the ink cartridge indicated by the type information corresponding to the order condition. Each order condition stored in the storage 102 in a process of S507 is referred to in a consumable item order process (see FIG. 7).

The CPU stores the model number and the serial number of the printer included as the unique information in the received notification in the table 102d of the storage 102 in association with the user account 102d0. In further detail, the CPU stores the model number and the serial number of the printer included as the unique information in the received notification in the printer model number 102d1 and the serial number 102d2 for the signed-in user account 102d0, respectively.

Meanwhile, when the order condition of the user using the PC 50 is already stored, the CPU determines that the currently received notification of the order condition is a notification for changing the order condition (S505: Yes). Then, the CPU determines, on the basis of the current use prediction information, whether or not the automatic order threshold value included in the received notification is appropriate (S506). In other words, the CPU determines whether or not there is a possibility that change of the automatic order threshold value included in the received notification results in an occurrence of a situation in which the consumable item is not ordered in time.

When the CPU determines that the automatic order threshold value included in the received notification is appropriate (S506: Yes), the CPU performs the process in S507. On the other hand, when the CPU determines that the automatic order threshold value is inappropriate (S506: No), the CPU displays the confirmation screen (not illustrated) on the browser as described above (S508), and subsequently performs the process in S502.

The confirmation screen is a screen for querying the inappropriate automatic order threshold value, and includes a message indicating that the automatic order threshold value currently inputted to the condition input screen is inappropriate and a button for selecting whether or not the inappropriate automatic order threshold value is changed. When the user inputs an instruction to change the inappropriate automatic order threshold value using the button displayed on the confirmation screen, a notification including an instruction to change the inappropriate automatic order threshold value is inputted to the management server 100 as a change confirmation notification. On the other hand, when the user inputs an instruction not to change the inappropriate automatic order threshold, a notification including an instruction not to change the inappropriate automatic order threshold is inputted to the management server 100 as the change confirmation notification.

When the CPU determines that the received notification is the change confirmation notification (S504: change confirmation), the CPU determines whether or not the notification includes an instruction to change the inappropriate automatic order threshold value (S509). As described above, the change confirmation notification is transmitted to the management server 100 in virtue of an input to the confirmation screen displayed in the process of S508. When the CPU determines that the change confirmation notification includes the instruction to change the inappropriate automatic order threshold value (S509: Yes), the CPU performs the process in S507. On the other hand, when the CPU determines that the change confirmation notification includes an instruction not to change the inappropriate automatic order threshold value (S509: No), the CPU ends this process. Note that, when the change confirmation notification includes an instruction not to change the inappropriate automatic order threshold value, only the inappropriate automatic order threshold value may not be changed and the appropriate automatic order threshold value may be changed according to an input to the condition input screen.

Figure 7:
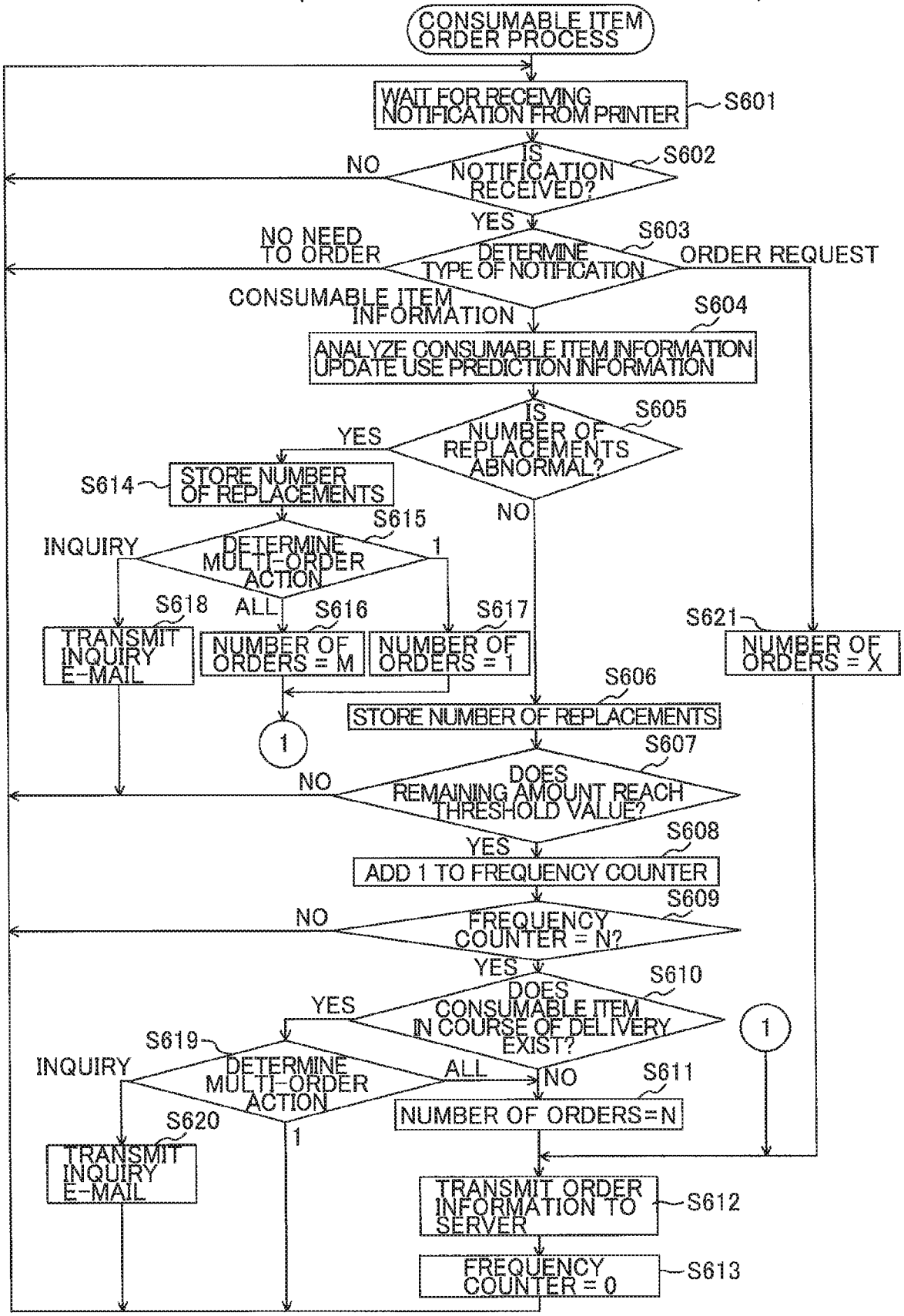
FIG. 7 is a flowchart illustrating a consumable item order process.

FIG. 7 is a flowchart illustrating the consumable item order process. This process is a process performed by the CPU of the controller 101 of the management server 100. This process starts as electric power is supplied to the management server 100. The CPU is on standby for reception of a notification from the printer 10 (S601). The CPU determines whether or not the notification has been received from the printer 10 (S602). When the CPU determines that the notification has not been received from the printer 10 (S602: No), the CPU performs the process in S601 again.

On the other hand, when the CPU determines that the notification has been received from the printer 10 (S602: Yes), the CPU determines a type of the received notification (S603). When the CPU determines that the received notification is a notification of the consumable item information (S603: consumable item information), the CPU analyzes the received consumable item information, and updates the use prediction information (S604). In other words, the CPU calculates the primary regression straight line L1 illustrated in FIG. 5 as the use prediction information. The CPU stores in the table 102d of the storage 102 the remaining amount indicated by the remaining amount information included in the consumable item information received in S604.

The CPU determines whether or not the number of replacements included in the received consumable item information is an abnormal value (S605). Specifically, when the number of replacements included in the currently received consumable item information is neither the same as nor consecutive to the number of replacements included in the previously received consumable item information, the CPU determines that the currently received number of replacements is an abnormal value. Note that, the number of replacements included in the previously received consumable item information is stored in the table 102d of the storage 102.

When the CPU determines the current number of replacements is not an abnormal value (S605: No), the CPU stores the current number of replacements in the storage 102 as the number of replacements included in the previously received consumable item information (S606). More specifically, the CPU stores the value of the number of replacements included in the currently received consumable item information in the number of replacements 102d10 of the table 102d. The CPU determines whether or not the remaining amount of the consumable item indicated by the remaining amount information included in the received consumable item information has reached the automatic order threshold value set on the input condition setting screen, that is, is smaller than the threshold value (S607). The threshold value used for the determination of S607 is the automatic order threshold value specified by the values input to the fields 23 and 24 of the input condition setting screen and is set for each type of the consumable item. In further detail, the threshold value used for the determination of S607 is defined as the values of the order index 102d5 and the threshold value 102d6 of each ink model number 102d3 in the table 102d.

When the CPU determines that the remaining amount indicated by the received consumable item information has not reached the automatic order threshold value yet (S607: No), the CPU performs the process in S601. On the other hand, when the CPU determines that the remaining amount indicated by the received consumable item information has reached the automatic order threshold value (S607: Yes), the CPU adds one (1) to a frequency counter installed in the storage 102 (S608). The frequency counter counts the number of consumable items that have not been shipped yet although the remaining amount has reached the automatic order threshold value. The frequency counter is installed for each unique information, that is, for each printer 10.

The CPU determines whether or not the value of the frequency counter has reached N (S609), and a value of N is the ordering frequency inputted to the field 25 of the condition input screen. In further detail, the value of N is the value of the ordering frequency 102d7 in the table 102d. When the CPU determines that the value of the frequency counter has reached N (S609: Yes), the CPU determines whether or not there is a consumable item in course of delivery, that is, whether or not a consumable item which is being delivered exists (S610). In the present embodiment, the shipping server 200 is configured to manage a delivery state of the consumable item, and the CPU asks the shipping server 200 whether or not there is a consumable item in course of delivery. Alternatively, the management server 100 may be configured to store a date on which the order information is transmitted to the shipping server 200. In this configuration, the CPU may acquire the number of delivery days based on the transmission date and the delivery destination information from the shipping server 200, and may determine whether or not there is a consumable item in course of delivery.

When it is determined that there is no consumable item in course of delivery (S610: No), the CPU sets the number of orders to N (S611), and transmits the order information of the consumable item indicating the set number of orders to the shipping server 200 (S612). As described above, the order information transmitted to the shipping server 200 includes the type information corresponding to the type of the consumable item whose remaining amount has reached the automatic order threshold value, the unique information of the printer 10 serving as the transmission source of the consumable item information for the consumable item to be the order target, and the order request. The CPU initializes the value of the frequency counter to zero (S613), and subsequently performs the process in S601.

When it is determined that there is a consumable item in course of delivery (S610: Yes), the CPU determines the order condition, that is, the multi-order action inputted to the field 26 of the condition input screen (S619). The CPU performs the determination of S619 on the basis of the value stored in the multi-order action 102d7 of the table 102d. When the multi-order action (the value stored in the multi-order action 102d7) indicates "all orders" (S619: all), the CPU sets the number of orders to N in order to order one consumable item based on the fact that the remaining amount has reached the automatic order threshold value (S611). Thus, the N number of new consumable items based on the fact that the remaining amount has currently reached the automatic order threshold value is delivered to the user together with the consumable item currently in course of delivery.

When the multi-order action indicates "only one order" (S619: 1), the CPU performs the process in S601 again. Thus, the consumable item is not ordered on the basis of the fact that the remaining amount has currently reached the automatic order threshold value, and only one consumable item currently in course of delivery is delivered to the user.

When the multi-order action indicates "the inquiry to the user" (S619: inquiry), the CPU transmits an inquiry message to an e-mail address previously registered in the shipping server 200 (S620), and subsequently performs the process in S601. The CPU acquires the e-mail address associated with the unique information of the printer 10 serving as the transmission source of the currently received consumable item information from the shipping server 200. The management server 100 may be configured to store the e-mail address.

As illustrated in FIG. 8, the inquiry e-mail transmitted in S620 includes a message 61 for informing of a current status, a URL 62 for transmitting an order request as a response to the e-mail to the management server 100, and a URL 63 for transmitting "no need to order" as a response to the e-mail to the management server 100, for example. When the URL 62 is clicked, the management server 100 receives a notification of the order request. On the other hand, when the URL 63 is clicked, the management server 100 receives a notification of the no need to order.

Referring back to S605 of FIG. 7, when the CPU determines that the current number of replacements is an abnormal value in S605 (S605: Yes), the CPU stores the current number of replacements in the storage 102 as the number of replacements included in the previously received consumable item information, similarly to S606 (S614). The CPU determines the order condition inputted to the field 26 of the condition input screen, similarly to S619 (S615).

When the multi-order action indicates "all orders" (S615: all), the CPU sets the number of orders to M (S616), and subsequently performs the process in S612. A value of M is obtained by subtracting the number of replacements included in the previously received consumable item information stored in the storage 102 from the number of replacements included in the currently received consumable item information. Thus, the consumable items that correspond in number to the number of replacements that has not been counted are delivered to the user. For example, when the value of M is ten (10), that is, when the number of replacements which has not been counted is ten, the ten consumable items are delivered to the user.

When the multi-order action indicates "only one order" (S615: 1), the CPU sets the number of orders to 1 (S617), and subsequently performs the process in S612. Thus, one consumable item is delivered to the user regardless of a difference between the number of replacements included in the currently received consumable item information and the number of replacements included in the previously received consumable item information stored in the storage 102.

When the multi-order action indicates the inquiry to the user (S615: inquiry), the CPU transmits the inquiry e-mail to the e-mail address previously registered in the shipping server 200, similarly to S620 (S618), and subsequently performs the process in S601.

The inquiry e-mail transmitted in S618 includes a message for informing of a current status, a URL for transmitting an order request as a response to the e-mail to the management server 100, and a URL for transmitting "no need to order" as a response to the e-mail to the management server 100, similarly to the inquiry e-mail transmitted in S620. When the former URL is clicked, the management server 100 receives a notification of the order request. When the latter URL is clicked, the management server 100 receives a notification of the no need to order.

When the CPU determines that the received notification is the notification of the order request in S603 (S603: order request), the CPU sets the number of orders to X (S621), and subsequently performs the process in S612. As described above, when the URL for transmitting the order request such as the URL 62 is clicked in the inquiry e-mail, the management server 100 receives the notification of the order request.

When the management server 100 receives the notification of the order request as the reply to the inquiry e-mail transmitted in S620, the number of orders X is set to 1 in S621. When the management server 100 receives the notification of the order request as the reply to the inquiry e-mail transmitted in S618, the number of orders X is set to a value obtained by subtracting the number of replacements included in the previously received consumable item information stored in the storage 102 from the number of replacements included in the currently received consumable item information.

Further, the number of orders may be 1 when the management server 100 receives the notification of the order request as the response to the inquiry e-mail transmitted in S618. Alternatively, the number of orders of the consumable item may be selected in the inquiry e-mail within the range of the value obtained by subtracting the number of replacements included in the previously received consumable item information stored in the storage 102 from the number of replacements included in the currently received consumable item information. In this case, the number of orders X is set to the selected number of orders.

According to the management server 100 of the first embodiment, it can be determined whether or not the consumable item is ordered on the basis of the order condition, such as the automatic order threshold value or the ordering frequency, inputted to the condition input screen. Thus, the consumable item can be delivered at an appropriate timing according to the situation of the user who input to the order input screen.

Particularly, when the automatic order threshold value is changed on the order input screen, if the change is determined to be inappropriate on the basis of the current use prediction information (the primary regression straight line L1), that is, if the consumable item is predicted not to be ordered in time, the management server 100 displays the confirmation screen on the browser of the PC 50. Thus, when the user changes the automatic order threshold value on the order input screen, the occurrence of a situation in which the consumable item being used according to a current use transition becomes unusable before the consumable item ordered on the basis of the changed automatic order threshold value is delivered can be suppressed.

According to the first embodiment, the multi-order action is inputted to the condition input screen as the order condition. Examples of the multi-order situation include a situation in which the same item as the consumable item that is the order target is in course of delivery and a situation in which the number of replacements included in the most recently received consumable item information is not consecutive to the immediately previous value. Thus, when the multi-order situation occurs, the order is placed according to the intention of the user who input to the order input screen. Accordingly, the duplicate order of the consumable item against the intention of the user can be suppressed.

Second Embodiment

Figure 9:
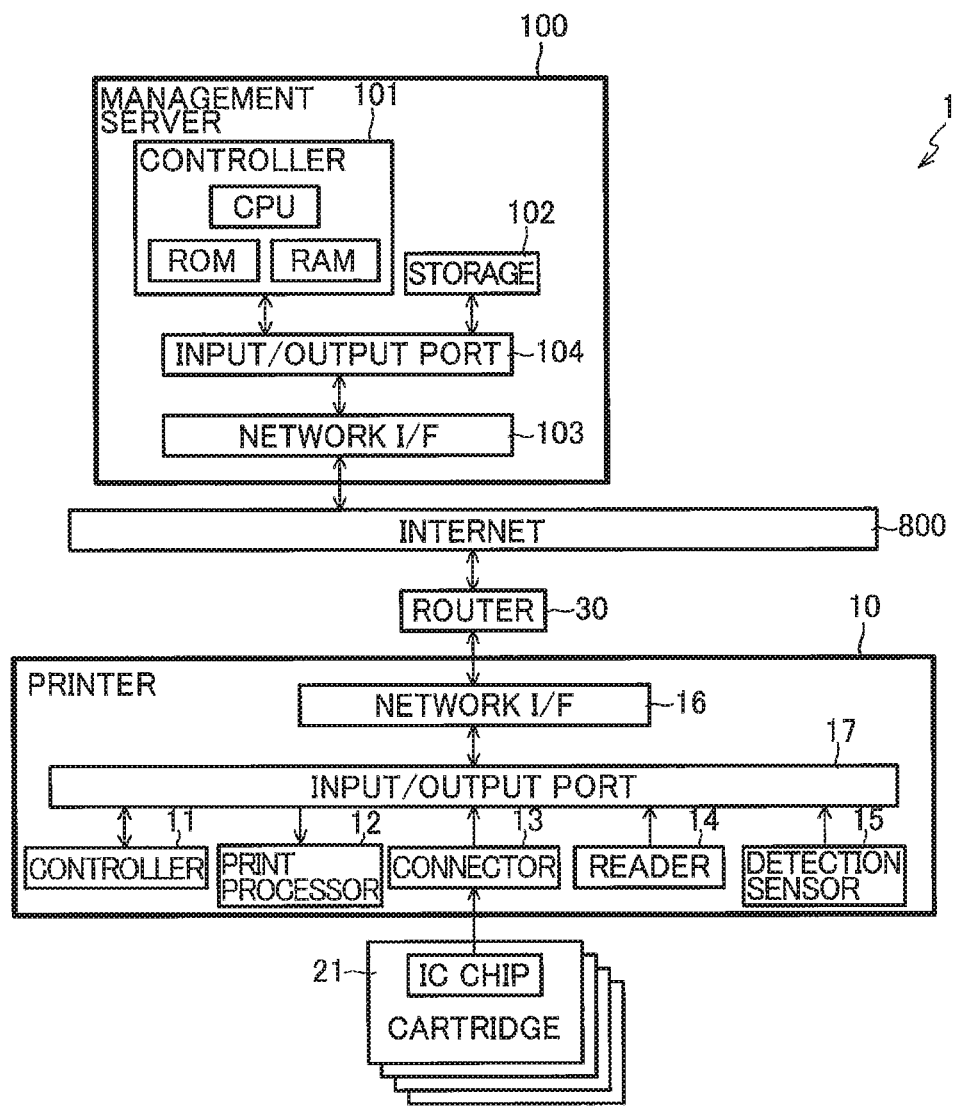
FIG. 9 is a block diagram illustrating an overall configuration of a consumable item ordering system according to a second embodiment.

In addition to the first embodiment described above, other embodiments will be described. First, a second embodiment will be described with reference to FIG. 9. The second embodiment differs from the first embodiment in that the shipping server 200 is not arranged. Also, in the second embodiment, the management server 100 undertakes the role of the shipping server 200. Thus, in S612 of FIG. 7, the CPU of the management server 100 does not transmit the order information to the shipping server 200, and the management server 100 ships the consumable item.

In the second embodiment, the management server 100 is an example of claimed "information processing apparatus." The management server 100 is also an example of claimed "server."

Third Embodiment

A third embodiment will be described with reference to FIG. 10. The third embodiment differs from the first embodiment in that, instead of the management server 100, the PC (personal computer) 50 undertakes the role of the management server 100. The printer 10 and the shipping server 200 have the same configurations as those of FIG. 2, and thus a detailed description thereof will be omitted.

In the third embodiment, the PC 50 is an example of claimed "information processing apparatus." The shipping server 200 is an example of claimed "server."

Figure 10:
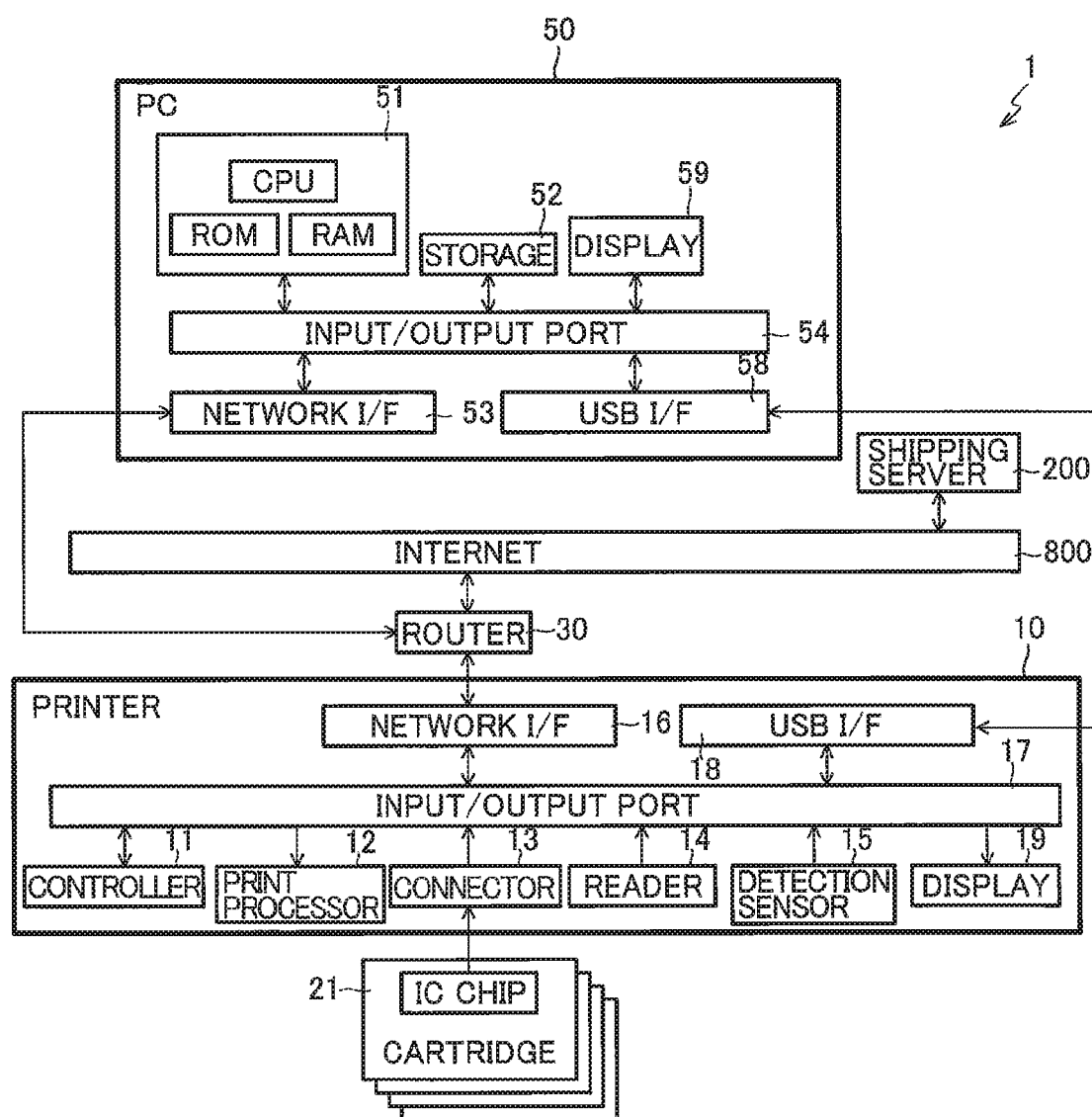
FIG. 10 is a block diagram illustrating an overall configuration of a consumable item ordering system according to a third embodiment.

The PC 50 according to the third embodiment includes a controller 51 as illustrated in FIG. 10. The controller 51 constitutes a computer including a CPU and a ROM and a RAM that are electrically connected to the CPU. The CPU controls an operation of the PC 50 according to a program and data stored in the ROM and a storage 52. The controller 51 is an example of claimed "controller."

The storage 52 is a non-volatile memory device. The storage 52 is, for example, a hard disk drive. The storage 52 stores various kinds of programs for controlling the operation of the PC 50. Further, the storage 52 stores the unique information of the printer 10 registered by the user for each user. A display 59 is, for example, a liquid crystal display, and displays various kinds of screens. The storage 52 is an example of claimed "storage."

A network I/F 53 is a device for performing communication with other devices connected to the Internet 800. A known network card may be employed as the network I/F 53. The PC 50 is connected to a router 30 via the network I/F 53. The PC 50 is connected to the Internet 800 via the router 30. A USB I/F 58 is connected to a USB I/F 18 of the printer 10. In other words, the PC 50 is connected to the printer 10 through the USBI/F. The respective units are connected to one another through an input/output port 54. The network I/F 53 is an example of claimed "communication I/F."

In the present embodiment, the order condition setting process illustrated in FIG. 6 and the consumable item order process illustrated in FIG. 7 are performed by the CPU of the PC 50. As will be described below in detail, a detailed description of the same steps as those of FIG. 5 in the first embodiment will be omitted, and the differences between the third embodiment and the first embodiment will be described. In S500 of FIG. 6, the CPU of the PC 50 acquires the delivery destination information from the shipping server 200. In S501, the condition input screen is displayed (outputted) on the browser of the display 59 of the PC 50, and in S502, the notification is received from the browser. In other words, the CPU receives the notification from the display 59. In S509, the CPU displays the confirmation screen (not illustrated) on the browser of the display 59. Here, information related to the confirmation screen may be transmitted to the printer 10, and the confirmation screen may be displayed on the display 19 of the printer 10.

Subsequently, in S602 of FIG. 7, the CPU of the PC 50 receives the notification. Here, the communication with the printer 10 may be performed through the network I/F 53 or the USB I/F 58. In S612 of FIG. 7, the CPU transmits the order information to the shipping server 200 on the basis of the unique information stored in the storage 52 through the network I/F.

Fourth Embodiment

A fourth embodiment will be described with reference to FIGS. 7, 11, and 12. The fourth embodiment differs from the first embodiment in that the management server 100 is not arranged. Also, in the fourth embodiment, printer 10 undertakes the role of the management server 100. In other words, the order condition setting process illustrated in FIG. 6 and the consumable item order process illustrated in FIG. 7 are performed by the CPU of the printer 10. As will be described later in detail, a detailed description of the same processes as those in the above embodiments will be omitted, and the differences between the fourth embodiment and the above embodiments will be described.

Figure 11:
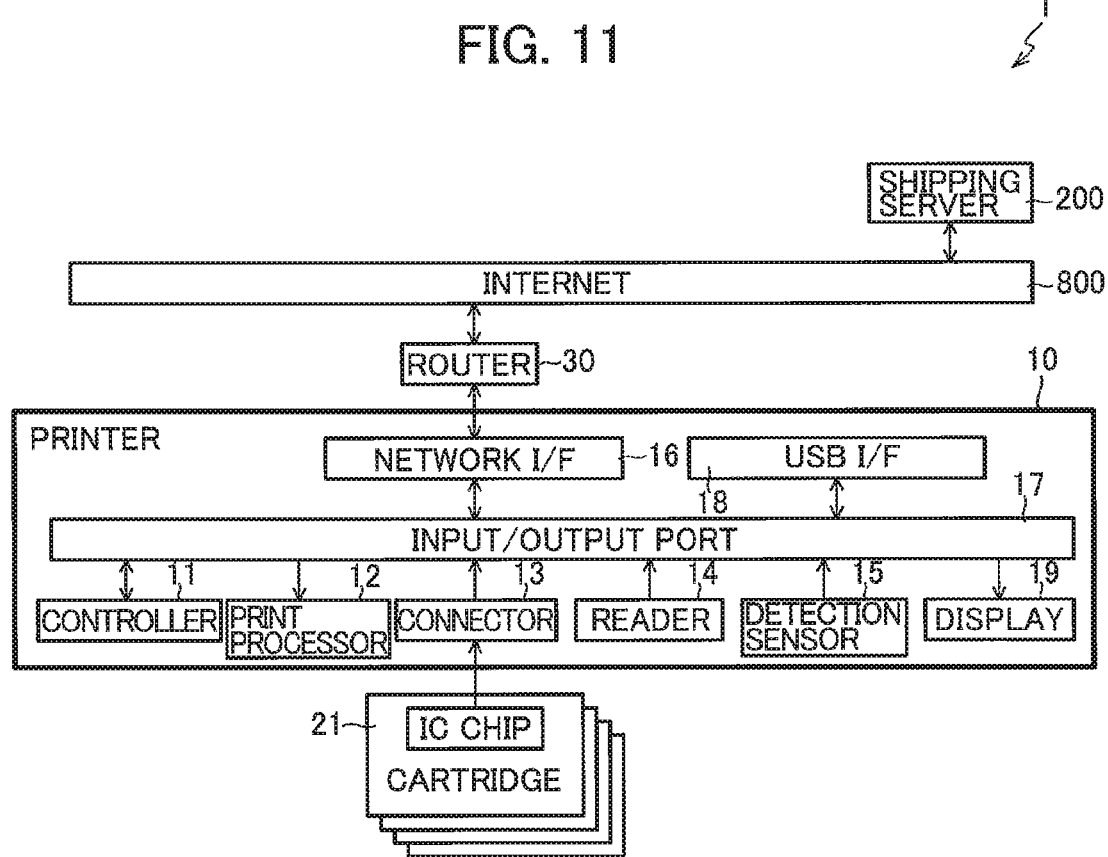
FIG. 11 is a block diagram illustrating an overall configuration of a consumable item ordering system according to a fourth embodiment.

The printer 10 of the present embodiment illustrated in FIG. 11 transmits the order information of the consumable item of the printer 10 to the shipping server 200. The type information of the consumable item and the unique information of the printer 10 are stored in, for example, a ROM of a controller 11 of the printer 10.

In the fourth embodiment, the printer 10 is an example of claimed "information processing apparatus." The shipping server 200 is an example of claimed "server." The controller 11 is an example of claimed "controller." The ROM of the controller 11 is an example of claimed "storage."

Next, the order condition setting process will be described with reference to FIG. 12. Steps of the same processes as those in FIG. 6 are denoted by the same reference numerals, and a description thereof will be omitted.

In the fourth embodiment, the order condition setting process is performed by the CPU of the controller 11 of the printer 10. This process starts when a situation in which the condition input screen is displayed on the display 19 or the PC 50 occurs. The situation in which the condition input screen is displayed occurs, for example, after the user registration of the printer 10 is performed or when the condition input screen display request is made from the display 19 or the PC 50 as necessary, for example, when the user changes the shipping condition.

The CPU of the controller 11 (hereinafter, referred to simply as a "CPU") acquires the delivery destination information corresponding to its own device from the shipping server 200 (S500). The CPU displays (outputs) the condition input screen on the display 19 (S801). At this time, the CPU may transmit (output) information related to the condition input screen to the PC 50 through the network I/F 16 or the USB I/F 18, and an input screen indicated by the information may be displayed on the browser of the display 59 of the PC 50. The network I/F 16 is an example of claimed "communication I/F." Also, the USB I/F 18 is an example of claimed "communication I/F."

The CPU is on standby for reception of the notification from the display 19 or the PC 50 (S802). At this time, when the input screen is displayed on the browser of the PC 50, the CPU may receive the notification from the browser. The CPU determines whether or not the notification has been received (S503). When the CPU determines that the notification has not been received (S503: No), the CPU performs the process in S602.

On the other hand, when the CPU determines that the notification has been received (S503: Yes), the CPU determines a type of the received notification (S504).

When the CPU determines that it is a new order condition in S505 (S505: No), for example, the CPU stores each order condition included in the received notification in the table 102*d* of the ROM of the controller 11 in association with the corresponding user account (S507), and ends this process. Note that, in the fourth embodiment, the table 102*d* is stored in the printer 10.

Then, when the CPU determines that the automatic order threshold value is inappropriate in S506 (S506: No), the CPU displays (outputs) the confirmation screen (not illustrated) on the display 19 as described above (S808), and subsequently performs the process in S502. At this time, the information related to the confirmation screen may be transmitted (output) to the PC 50, and the confirmation screen may be displayed on the browser of the PC 50.

Next, a flowchart indicating the consumable item order process of the fourth embodiment will be described with reference to FIG. 7 focusing on differences between the fourth embodiment and the above described embodiments. In the fourth embodiment, the consumable item order process is performed by the CPU of the controller 11 of the printer 10. This process starts as electric power is supplied to the printer 10. The CPU is on standby for reception of the notification from the printer 10 (S601). The CPU determines whether or not the notification has been received from the printer 10 (S602). When the CPU determines that the notification has not been received from the printer 10 (S602: No), the CPU performs the process in S601.

On the other hand, when the CPU determines that the notification has been received from the printer 10 (S602: Yes), the CPU determines a type of the received notification (S603). When the CPU determines that the received notification is a notification of the consumable item information (S603: consumable item information), that is, when the information related to the remaining amount of the consumable item is received from the detecting sensor 15, the CPU analyzes the received consumable item information, and updates the use prediction information (S604). In other words, the CPU calculates the primary regression straight line L1 illustrated in FIG. 5 as the use prediction information. In S604, for example, the CPU stores the remaining amount indicated by the remaining amount information included in the received consumable item information in the table 102*d* of the ROM in the controller 11.

When the CPU determines that there is no consumable item in course of delivery in S610 (S610: No), the CPU sets the number of orders to 1 (S611), and transmits the order information of the consumable item indicating the set number of orders to the shipping server 200 (S612)

Then, when the multi-order action indicates "the inquiry to the user" (S619: inquiry), the CPU transmits an inquiry e-mail to an e-mail address previously registered in the shipping server 200 (S620), and subsequently performs the process in S601. The CPU acquires the e-mail address associated with the unique information of the printer 10 serving as the transmission source of the currently received consumable item information from the shipping server 200. The printer 10 may be configured to store the e-mail address.

The inquiry e-mail transmitted in S620 includes a message 61 for informing of a current status, a URL 62 for transmitting an order request to the printer 10 as a response to the e-mail, and a URL 63 for transmitting "no need to order" to the printer 10 as a response to the e-mail, for example, as illustrated in FIG. 8. When the URL 62 is clicked, the printer 10 receives a notification of the order request. On the other hand, when the URL 63 is clicked, the printer 10 receives a notification of the no need to order. A form in which an inquiry is performed, and a response to the inquiry are received is not limited to the e-mail, and may be performed through the network I/F 16 or the USB I/F 18.

In S618, when the multi-order action indicates "the inquiry to the user" (S615: inquiry), the CPU transmits an inquiry e-mail to an e-mail address previously registered in the shipping server 200 (S618), similarly to S620, and subsequently performs the process to proceed in S601.

According to the second, third, and fourth embodiments, the multi-order action can be inputted to the condition input screen as the order condition. Examples of the multi-order situation include a situation in which the same item as the consumable item that is the order target is in course of delivery and a situation in which the number of replacements included in the most recently received consumable item information is not consecutive to the immediately previous value. Thus, when the multi-order situation occurs, the order is placed according to the intention of the user who input to the order input screen, and thus the duplicate order of the consumable item against the intention of the user can be suppressed.

The first, second, third, and fourth embodiments have been described above, but the embodying according to the present disclosure are not limited to the above embodiments. It would be apparent to those skilled in the art that various changes and modifications may be made therein without departing from the scope of the disclosure. The management server in the present disclosure can be realized in various manners or forms, such as a controller, a control method, and a control program for controlling an information processing apparatus, a storage medium storing the control program.

For example, in the above embodiments, one server that physically exists has been described as the management server 100 that is claimed "the management server." The management server 100 may be a virtual machine that functions as one server by collaboration of a plurality of physical devices. For example, the management server 100 may be configured to function as one server by collaboration of a first server that receives the consumable item information from the printer 10 and a second server that determines whether or not an order is placed on the basis of the consumable item information acquired from the first server.

Further, the management server 100 may be configured to have the function of the shipping server 200.

In the above embodiments, the printer 10 has been described as an example of a device connected to the management server 100, but the management server 100 may be a multi-function peripheral device having at least a printing function. In the above embodiments, the ink cartridge has been described as an example of the consumable item, but the consumable item may be the toner cartridge.

In the above embodiments, the printer 10 is configured to transmit the consumable item information directly to the management server 100 via the Internet 800. Alternatively, the consumable item information of the printer 10 may be indirectly transmitted to the management server 100 through the PC 50 or an information processing apparatus such as another PC. In this case, a connection between the printer 10 and the information processing apparatus that relays the consumable item information received from the printer 10 may be a wired connection by a USB or a LAN, or a wireless connection by a wireless LAN.

The recitation "output" means both the case in which claimed "controller" outputs information to an external device and the case in which the claimed "controller" displays a screen to on its own device, for example, in a case where a controller of an information processing apparatus displays a screen on a display provided in the information processing apparatus. Also, the recitation "acquire" means both the case in which the claimed "controller" acquires information from an external device and the case in which the claimed "controller" acquires information from its own device, for example, in a case a controller of an information processing apparatus acquires information from a storage provided in the information processing apparatus.

In the above embodiments, the primary regression straight line has been described as the use prediction information of the consumable item. However, if information can be used to statistically predict a consumption state of the consumable item, various kinds of statistically calculated prediction formulas can be used without being limited to the primary regression straight line. In the above embodiments, each time the consumable item mounted to the printer 10 is replaced, the plotted points in FIG. 5 indicating the time change in the remaining amount is generated, and the use prediction information (the primary regression straight line L1) is calculated, but the use prediction information may be calculated using previous data, that is, values of the change in the remaining amount of the consumable item mounted before the currently mounted consumable item.

In the case of using the previous data, the process of S505 may be omitted. In other words, when a new order condition is inputted to the condition input screen, it may be determined whether or not the automatic order threshold value is appropriate on the basis of the use prediction information calculated from the previous data.

In the above embodiments, the value indicating the remaining amount of the consumable item has been described as the remaining amount information, but when a print count is included in the consumable item information, the print count may be used for the remaining amount information. In other words, the value of the print count may be an index of the remaining amount of the consumable item. Note that, the "print count" is a value indicating the number of pages printed using the current consumable item for the consumable item of the type indicated by the type information included in the consumable item information. The printer 10 includes a print counter that counts the number of pages printed using the current consumable item for each type of the consumable item. The print counter is initialized to zero each time the consumable item is replaced. The printer 10 includes the value of the print counter in the consumable item information as the print count.

In the above embodiments, the condition input screen and the confirmation screen are displayed on the browser of the PC 50, but the display destination of the screens may be a terminal such as a smartphone or a tablet. Alternatively, these screens may be displayed on a display (for example, a liquid crystal display device) of the printer 10.

In the above embodiments, the inquiry e-mail is transmitted in S618 and S620, but a screen including the same content as the inquiry e-mail may be displayed on the browser of the PC 50 or the display of the printer 10.

In the above embodiments, the inquiry e-mail transmitted in S618 may be configured to include a URL for transmitting the response of the order request or the no need to order the management server 100. In addition to this, when the order request is transmitted in response to the inquiry e-mail, a response designating the number of orders may be transmitted. For example, URLs for the order request that correspond to the number of orders are included in the inquiry e-mail.

Alternatively, when the management server 100 receives the response of the order request, an e-mail for querying the number of orders may be transmitted. In the present modified example, an excessive number of consumable items can be suppressed from being ordered by setting the number of selectable orders within a range according to a difference between the current number of replacements and the previous number of replacements.

The condition input screen may be configured so that a delivery form is selected. In other words, the condition input screen may be configured so that a first delivery form for delivering the consumable item in the normal number of delivery days or a second delivery form for delivering the consumable item in the special number of delivery days shorter than normal can be selected. In the present modified example, when the order information is transmitted in S612, the management server 100 includes information indicating the delivery form inputted on the condition input screen in the order information and transmits the resulting order information. The delivery form may be set by a method other than an input to the condition input screen.

In the above embodiments, the delivery destination information is stored in the shipping server 200, and the management server 100 is configured to acquire the delivery destination information from the shipping server 200, but the delivery destination information may be stored in the storage 102 of the management server 100.

In the above embodiments, the order information is transmitted to the shipping server 200 in S612 when it is determined that there is no consumable item in course of delivery in S610, but it may be queried using e-mail and the like whether or not an order is placed before S612. Thus, even when the order condition is met, no order may be placed if unnecessary according to the user's situation.

Figure 12:
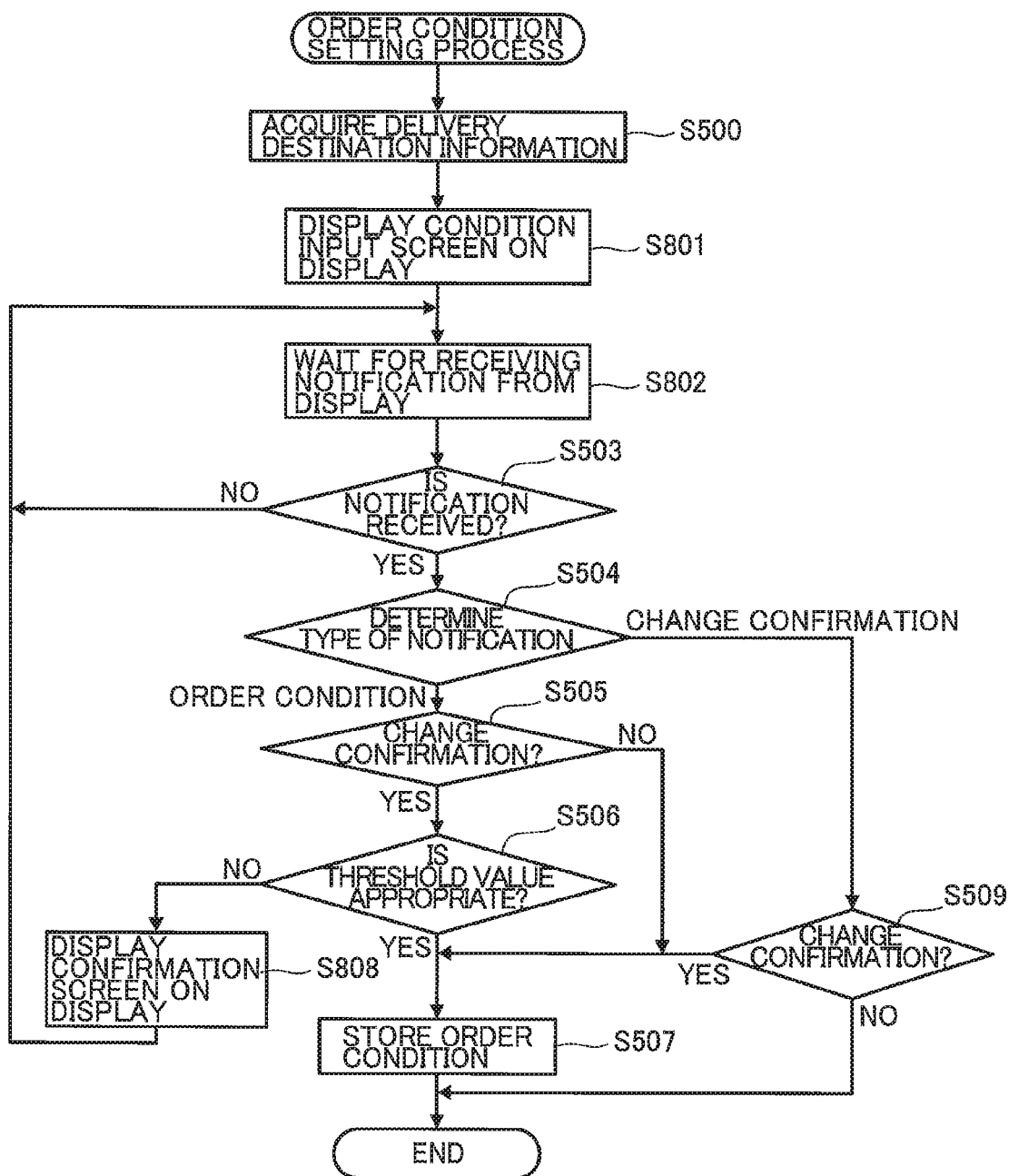
FIG. 12 is a flowchart illustrating an order condition setting process.

In the above embodiments, the processes described in FIGS. 6, 7 and 12 are performed by the CPU of the controllers 101 or 11, but the processes described in the respective drawings may be performed by collaboration of a plurality of CPUs. Also, the processes described in the respective drawings may be performed by single IC or collaboration of a plurality of ICs such as ASICs. Furthermore, the processes described in the respective drawings may be performed by collaboration of the CPU and the IC such as the ASIC.

What is claimed is:

1. A management server comprising:
   a communication interface;
   a storage storing a set of program instructions; and
   a controller, when executing the set of program instructions, configured to cause the management server to:
   generate, for display on a user device, a user interface comprising a selectable region, wherein the selectable region comprises selectable threshold values specific to a printer cartridge of a specific color, and wherein the user interface is associated with an image forming apparatus and a user account;
   output, via the communication interface to the user device, the user interface;
   receive, via the communication interface, a user interaction with the user interface, wherein the user interaction comprises a selection, for the printer cartridge of the specific color, of a specific threshold value from the selectable threshold values;
   store, in the storage, the selection of the specific threshold value associated with the image forming apparatus of the user account;
   receive, from a detection sensor of the image forming apparatus, remaining amount information about a remaining amount of ink or toner in the printer cartridge connected to the image forming apparatus;
   determine, in response to receiving the remaining amount information, whether or not the remaining amount satisfies the specific threshold value based on the remaining amount information;
   determine, in response to determining that the remaining amount satisfies the specific threshold value, whether or not a previously ordered printer cartridge is currently being delivered, by communication with a shipping server via the communication interface, the shipping server being configured to manage a delivery state of the previously ordered printer cartridge; and
   output, in response to determining that a previously ordered printer cartridge is not currently being delivered based on the communication with the shipping server, order information to the shipping server, the order information including information about an order of a new printer cartridge.

2. The management server according to claim 1, wherein the controller, when executing the set of program instructions, is further configured to cause the management server to:
   in response to determining that a previously ordered printer cartridge is currently being delivered, output, as an inquiry, inquiry information for inquiring whether or not to order the new printer cartridge;
   receive reply information from an output destination to which the inquiry information has been outputted, the reply information representing a reply to the inquiry by the inquiry information; and
   in response to receipt of the reply information representing an affirmative reply, output the order information to the shipping server.

3. The management server according to claim 1, wherein the controller, when executing the set of program instructions, is further configured to cause the management server to:
   output, as an inquiry, inquiry information for inquiring about a desired delivery form of the new printer cartridge;

receive reply information from an output destination to which the inquiry information has been outputted, the reply information representing a reply to the inquiry by the inquiry information; and output the order information, including delivery form information about the desired delivery form indicated by the reply represented by the reply information, to the shipping server.

4. The management server according to claim 1, wherein the controller, when executing the set of program instructions, is further configured to cause the management server to:

determine whether a period of time from a first timing when the remaining amount of the ink or the toner is predicted to satisfy the specific threshold value to a second timing when the remaining amount of the ink or the toner is predicted to run out is shorter than a number of days required for completion of delivery of the new printer cartridge, the first timing and the second timing being predicted based on a trend in printer cartridge consumption, the trend being calculated based on a plurality of values of remaining amount represented by a plurality of sets of remaining amount information received a plurality of times; and in response to the period of time from the first timing to the second timing being shorter than the number of days required for completion of delivery, output alert information indicating that the specific threshold value is inappropriate.

5. The management server according to claim 1, wherein the controller, when executing the set of program instructions, is further configured to cause the management server to receive the remaining amount information by receiving printer cartridge information including the remaining amount information, and wherein the printer cartridge information further includes unique information, the unique information being for specifying the image forming apparatus from which the controller has received the remaining amount information.

6. The management server according to claim 1, wherein the order information further includes unique information, the unique information being for specifying the image forming apparatus from which the controller has received the remaining amount information.

7. The management server according to claim 1, wherein the controller, when executing the set of program instructions, is further configured to cause the management server to receive the remaining amount information at a predetermined interval.

* * * * *